US012118390B2

(12) United States Patent
Gottipati et al.

(10) Patent No.: US 12,118,390 B2
(45) Date of Patent: Oct. 15, 2024

(54) SYSTEM AND METHOD FOR SECURE RECOVERY OF APPLICATION GROUP IN CONTAINER DEPLOYMENT ENVIRONMENTS

(71) Applicant: Druva Inc., Sunnyvale, CA (US)

(72) Inventors: Srikiran Gottipati, Vijayawada (IN); Preethi Srinivasan, Sunnyvale, CA (US); Stephen Manley, Livermore, CA (US); Nishith Chitaliya, Amravati (IN)

(73) Assignee: Druva Inc., Santa Clara, CA (US)

( * ) Notice: Subject to any disclaimer, the term of this patent is extended or adjusted under 35 U.S.C. 154(b) by 84 days.

(21) Appl. No.: 17/741,727

(22) Filed: May 11, 2022

(65) Prior Publication Data

US 2023/0126377 A1    Apr. 27, 2023

(30) Foreign Application Priority Data

Oct. 26, 2021    (IN) .............................. 202141048856

(51) Int. Cl.
*G06F 9/50*    (2006.01)
*G06F 8/60*    (2018.01)
*G06F 11/14*   (2006.01)

(52) U.S. Cl.
CPC .............. *G06F 9/5005* (2013.01); *G06F 8/60* (2013.01); *G06F 11/1461* (2013.01); *G06F 11/1469* (2013.01); *G06F 2201/84* (2013.01)

(58) Field of Classification Search
CPC ...... G06F 9/5005; G06F 8/60; G06F 11/1461; G06F 11/1469; G06F 2201/84; G06F 9/45558; G06F 2009/45562; G06F 11/1464
See application file for complete search history.

(56) References Cited

U.S. PATENT DOCUMENTS

| | | | |
|---|---|---|---|
| 2008/0155216 A1* | 6/2008 | Shoham .............. | G06F 11/1435 714/E11.122 |
| 2013/0238676 A1* | 9/2013 | Zha .......................... | G06F 16/25 707/827 |
| 2019/0042290 A1* | 2/2019 | Bailey ........................ | G06F 8/60 |
| 2020/0175208 A1* | 6/2020 | Yu ........................ | H04L 9/3236 |
| 2022/0292002 A1* | 9/2022 | Kumar ................ | G06F 11/1484 |
| 2023/0009739 A1* | 1/2023 | Ponnuswamy ....... | H04L 9/0894 |

* cited by examiner

*Primary Examiner* — Mark D Featherstone
*Assistant Examiner* — Kweku William Halm
(74) *Attorney, Agent, or Firm* — IceMiller LLP

(57) ABSTRACT

A system for secure recovery of an application group in a container deployment environment is presented. The system includes a backup controller configured to access an application group token and generate a corresponding backup token. The system further includes a backup module configured to initiate a backup based on the backup token and create a corresponding recovery point on a backup server. The system further includes a recovery access token module configured to access a recovery access token for a determined recovery point. The system further includes a recovery controller configured to generate a recovery token corresponding to the determined recovery point based on the recovery access token, and a recovery module configured to initiate a recovery of the application group from the backup server in a destination cluster based on the recovery token. A related method is also presented.

20 Claims, 9 Drawing Sheets

SYSTEM AND METHOD FOR SECURE RECOVERY OF APPLICATION GROUP IN CONTAINER DEPLOYMENT ENVIRONMENTS

CROSS-REFERENCE TO RELATED APPLICATION

This application claims a benefit of, and priority to, India Provisional Patent Application No. 202141048856, filed Oct. 26, 2021, the contents of which is incorporated by reference in its entirety.

BACKGROUND

Embodiments of the present invention generally relate to secure recovery of application groups in container deployment environments, and more particularly to secure recovery of application groups in a Kubernetes environment.

An application running within a Kubernetes environment consists of native Kubernetes resources (e.g., service accounts, stateful sets, persistent volumes, secrets, etc.) and custom resources that are defined specifically for that application. Ensuring the security of the applications during recovery can be challenging because snapshotting or data backups do not inherently capture the security and authorization information. Moreover, the ownership properties of the application are lost as backups are stored outside the Kubernetes cluster. Thus, the security of the application is merely related to protecting the storage of the copies. However, this is ineffective because it cannot support the increasingly growing multiple admin/stakeholder scenarios that organizations are facing today when it comes to application protection. Therefore, heavy lifting needs to be done by backup and cloud administrators in retrieving and bringing back the applications.

Thus, there is a need for systems and methods that enable secure recovery of applications in the Kubernetes environment which also provides for ownership control.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for secure recovery of an application group in a container deployment environment is presented. The system includes a backup controller configured to access an application group token corresponding to the application group and generate a corresponding backup token when a backup of the application group is initiated. The system further includes a backup module configured to initiate a backup based on the backup token and create a corresponding recovery point on a backup server. The system further includes a recovery access token module configured to access a recovery access token for a determined recovery point when a recovery of the application group is initiated. The system further includes a recovery controller configured to generate a recovery token corresponding to the determined recovery point based on the recovery access token. The system furthermore includes a recovery module configured to initiate a recovery of the application group from the backup server in a destination cluster based on the recovery token.

According to another example embodiment, a method for secure recovery of an application group in a container deployment environment is presented. The method includes accessing an application group token corresponding to the application group and generating a corresponding backup token when a backup of the application group is initiated. The method further includes initiating a backup based on the backup token and creating a corresponding recovery point on a backup server. The method further includes accessing a recovery access token for a determined recovery point when a recovery of the application group is initiated. The method further includes generating a recovery token corresponding to the determined recovery point based on the recovery access token. The method furthermore includes initiating a recovery of the application group from the backup server in the destination cluster based on the recovery token.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
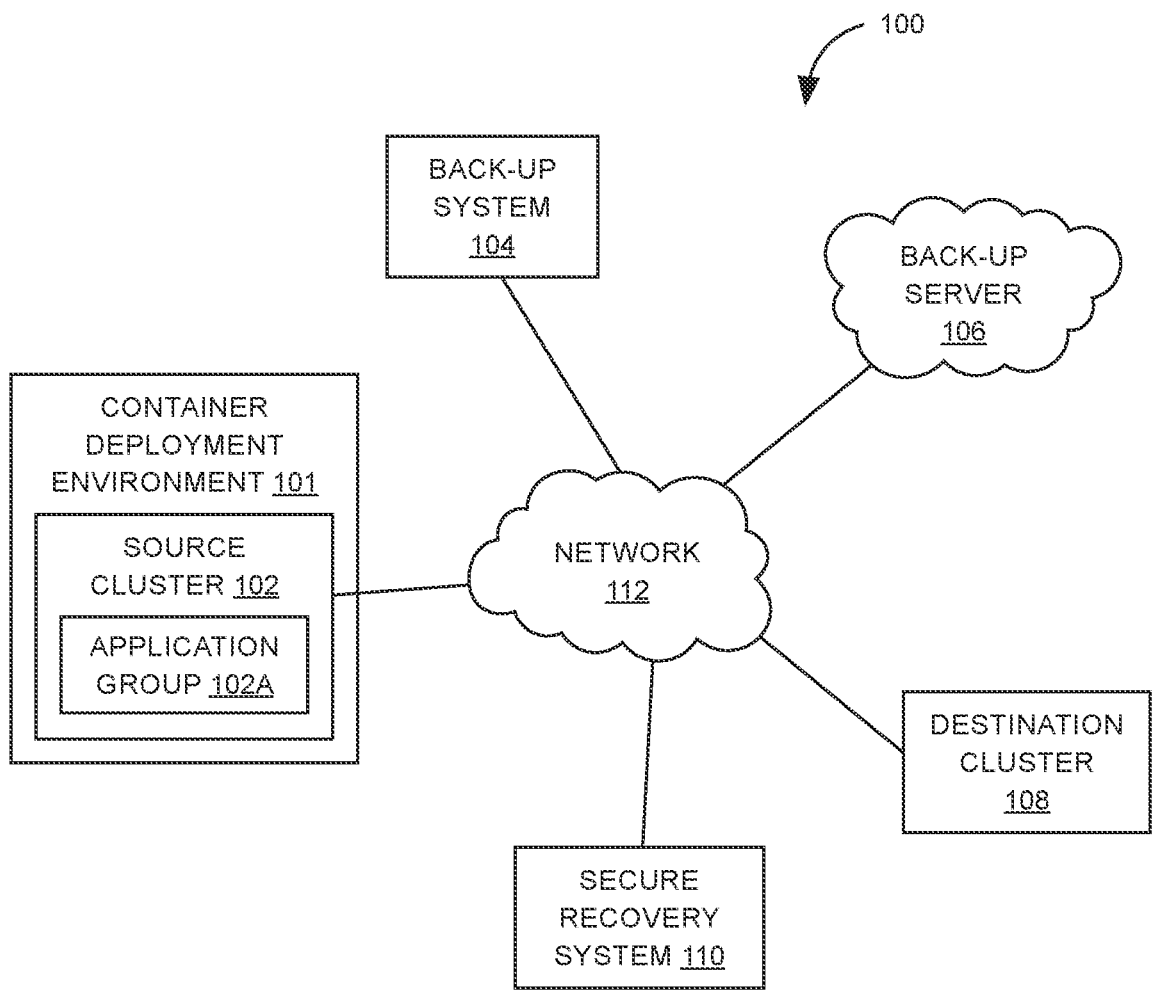
FIG. 1 illustrates an example backup/recovery system environment for secure recovery of an application group in a container deployment environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for secure recovery of application groups in a container deployment environment. Non-limiting examples of container deployment environments include Docker Swarm, Kubernetes, Openshift, Hashicorp, Rancher, Mesos, cloud container environments in AWS, Azure, Google Cloud, and the like. For the purpose of this description, the following embodiments are described with respect to a Kubernetes-based container deployment environment. However, it must be understood that embodiments described herein can be implemented in any container deployment environment.

The term "application group" as used herein refers to an application definition running within a Kubernetes environment. The application group running on a Kubernetes cluster consists of a set of Kubernetes resources created at installation time or post-installation runtime. The resources created at installation may include native Kubernetes resources (e.g., service accounts, stateful sets, persistent volume, secrets, and the like), and potentially custom resources that are defined specifically for a particular application.

As noted earlier, in some embodiments, the application groups may be cluster-scoped or namespace-scoped. In some other embodiments, the application group may be defined based on reference graphs. In some embodiments, the application group may be defined using the systems and methods described in U.S. patent application Ser. No. 17/590,966, titled "System and method for automatically identifying application groups in container deployment environments" or U.S. patent application Ser. No. 17/591,236, titled "System and method for reference-aware application identification in container deployment environments", incorporated by reference in their entirety unless directly contradictory to the embodiments described herein.

Non-limiting examples of application group recovery use cases include backup restore, disaster recovery, compliance recovery, accidental deletion-related recovery, ransomware-related recovery, malicious deletion-related recovery, cloning, and the like.

FIG. 1 illustrates an example backup/recovery system environment 100 for secure recovery of an application group in a container deployment environment 101, in accordance with some embodiments of the present description. The backup/recovery system environment 100 includes a source cluster 102 having an application group 102A, a backup system 104, a backup server 106, a destination cluster 108, and a secure recovery system 110. The backup/recovery system environment 100 is configured to back up one or more application groups from the source cluster 102 in the backup server 106 using the backup system 104. Further, the backup/recovery system environment 100 is configured to recover the one or more application groups from the backup server 106 to the destination cluster 108 using the secure recovery system 110.

The backup system 104 and the secure recovery system 110 may be software or hardware components. In some embodiments, the backup system 104 and/or the secure recovery system 110 are cloud-based services. In some embodiments, the backup server 106 is a cloud-based storage. Non-limiting examples of suitable backup server 106 include AMAZON S3, RACKSPACE CLOUD FILES, AZURE BLOB STORAGE, and GOOGLE CLOUD STORAGE.

It should be noted that while the container deployment environment 101, the source cluster 102, the backup system 104, the destination cluster 108, and the secure recovery system 110 are each represented by separate blocks in FIG. 1, one or more of these components may be co-located. For example, in some embodiments, the backup system 104 and/or the secure recovery system 110 may be located within the container deployment environment 101 itself. Furthermore, the destination cluster 108 may be located within the container deployment environment 101 itself, as described in detail later.

Moreover, while the container deployment environment 101, the source cluster 102, the backup system 104, the backup server 106, the destination cluster 108, and the secure recovery system 110 are each represented by a single block in FIG. 1, each of these components may include multiple distributed and/or independent computers (may also be referred to as workers) working cooperatively and in parallel with other computers so that the operation of the entire system will not be affected when one or more workers are down.

It should be noted that although a single block 112 is shown to represent a network in FIG. 1, the system environment 100 may include a plurality of networks 112 to connect different components of the system environment 100. The various components in the backup/recovery system environment 100 may communicate through an external network 112 and/or a local network 112. For example, in some embodiments, the backup system 104 and/or the secure recovery system 110 may be located within the container deployment environment 101 itself and may communicate locally. In one embodiment, the network 112 uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

Example embodiments of the present description provide for a unified workflow that allows for secure recovery of an application group by an application group owner, a cluster administrator, or a cloud administrator.

Figure 2:
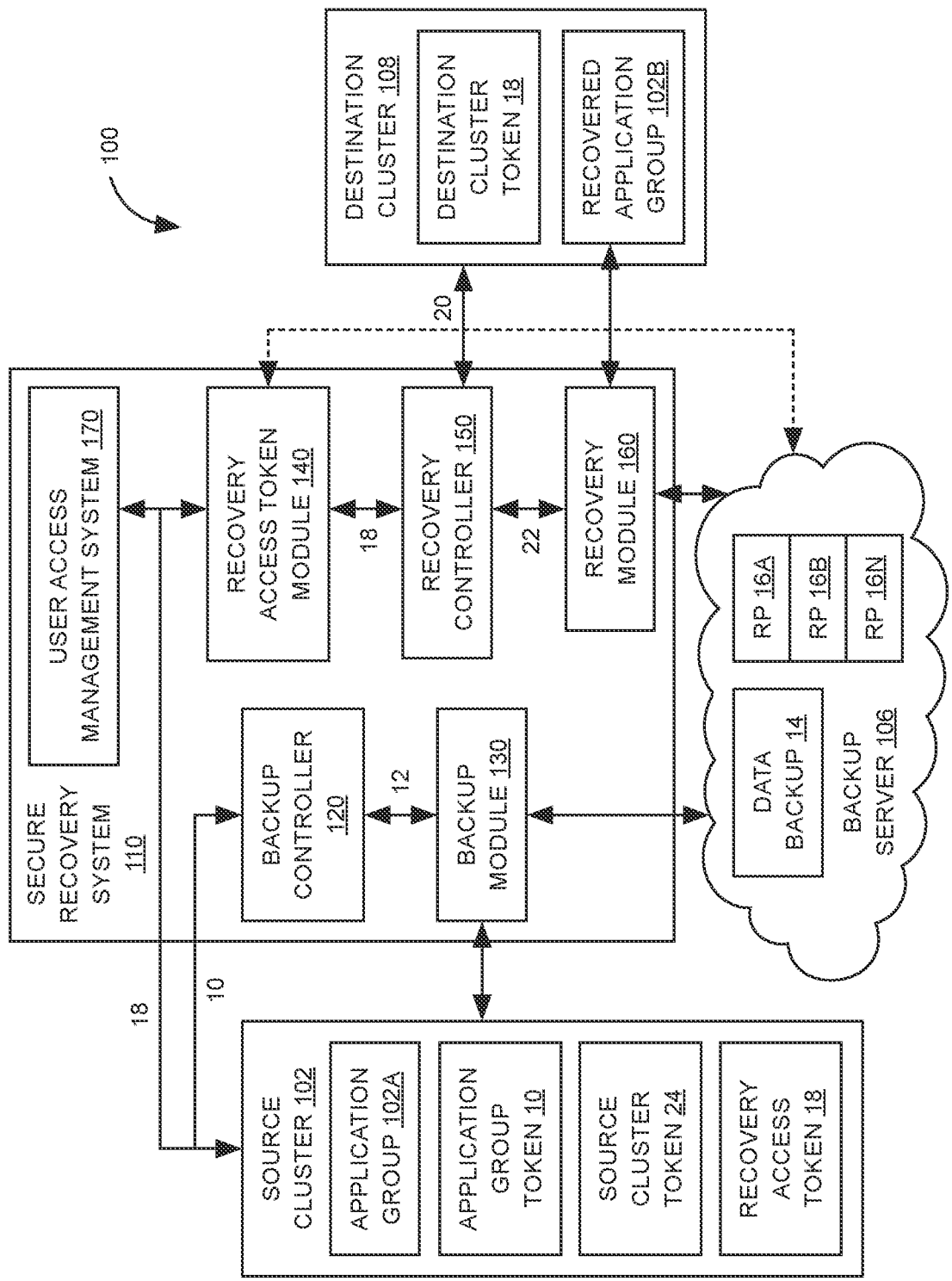
FIG. 2 illustrates an example backup/recovery system environment for secure recovery of an application group in a container deployment environment, according to some aspects of the present description.

FIG. 2 illustrates an example backup/recovery system environment 100 for secure recovery of an application group 102A in a container deployment environment 101 (e.g., in a Kubernetes cluster 101). The following embodiments are described with respect to a Kubernetes cluster; however, it must be understood that embodiments described herein can be implemented in any container deployment environment. Further, the following embodiments are described with respect to a single application group 102A, however, it must be understood that the embodiments described herein allow for secure recovery of one or more application groups.

The backup/recovery system environment 100 includes a system 110 for secure recovery of the application group 102A (sometimes herein referred to as "secure recovery system"). The secure recovery system 100 includes a backup controller 120, a backup module 130, a recovery access token module 140, a recovery controller 150, and a recovery module 160. Each of these components is described in detail below.

The backup controller 120 is configured to access an application group token 10 corresponding to the application group 102A and generate a corresponding backup token 12 when a backup of the application group 102A is initiated. Non-limiting examples of information present in the application group token 10 include organization ID, account ID, cloud ID, region ID, application group instance ID, expiration information, and the like. Non-limiting examples of information present in the backup token 12 include application instance ID, backup ID, organization ID, account ID, cloud ID, region ID, and the like.

The application group token 10 may be stored in the source cluster 102 where the application group 102A was registered, as shown in FIG. 2. The application group token may be generated upon registration of the application group within a cluster, as described in detail later with reference to FIGS. 5 and 6. The backup controller 102 may be configured to access the application group token 10 from the source cluster 102 when a backup process for the application group 102A is initiated.

The backup module 130 is configured to initiate a backup based on the backup token 12 and create a corresponding recovery point on a backup server 106. In FIG. 2, the data backup of the application group (including snapshots, metadata, log files, and the like) is represented by data back up 14, and the one or more recovery points are represented by RP16A, RP16B, . . . RP16N.

Figure 3:
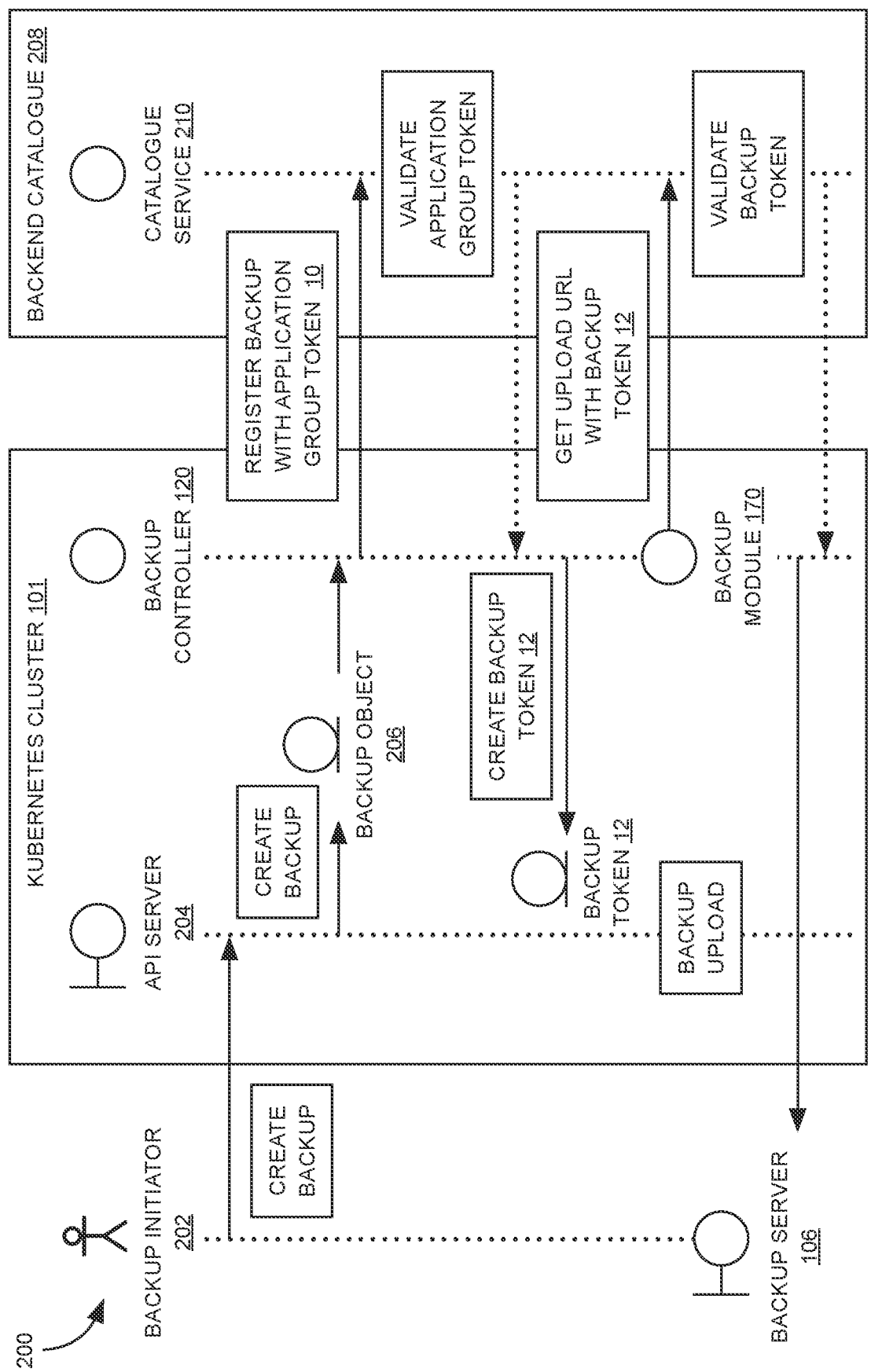
FIG. 3 illustrates an example backup workflow, according to some aspects of the present description.

FIG. 3 illustrates an example backup workflow 200 according to an embodiment of the present description. As shown in FIG. 3, a backup initiator 202 (e.g., an application group user/admin) initiates a create backup request with the API server 204 in the Kubernetes cluster 101. Correspondingly, a backup object 206 is created in the Kubernetes cluster 101. Upon the creation of the backup object 206, the backup controller 120 accesses the application group token 10 and registers the backup at the backend catalogue 208. The catalogue service 210 at the backend catalogue 208 validates the application group token 10 and creates a backup token 12 in exchange, as shown in FIG. 3. The backup module 130 requests an upload URL from the catalogue serve 210 at the backend catalogue using the backup token 12, and uploads the backup data to the backup server 106 using the upload URL. As noted earlier, the backup module 130 is further configured to create a recovery point corresponding to every backup instance.

Referring again to FIG. 2, the recovery access token module 140 is configured to access a recovery access token 18 for a determined recovery point when a recovery of the application group is initiated. In some embodiments, the recovery access token module 140 is further configured to access one or more recovery points from the backup server 106 corresponding to the application group 102A, and allow a user to select a recovery point from the one or more recovery points (RP) 16A, 16B, . . . 16N as the determined recovery point.

The recovery access token 18 may be stored in the source cluster 102 where the application group 102A was registered, as shown in FIG. 2. The recovery access token module 140 may be configured to access the recovery access token 18 from the source cluster 102 when a recovery process for the application group 102A is initiated.

As noted earlier, the recovery of the application group 102A may be initiated by an application group user, a cluster administrator, or a cloud administrator. Embodiments of the present description provide workflows for all of these instances.

For example, in some embodiments, the recovery of the application group 102A may be initiated by an application group user, and the secure recovery system 110 may further include a user access management module 170. The user access management module 110 is configured to match a userinfo of a user requesting the recovery access token 18 with a userinfo corresponding to the application group 102A before the recovery access token 18 is generated. This may be particularly applicable in instances where the application group 102 may not exist in the source cluster 102 at the time of requesting the recovery access token 18.

In some embodiments, the recovery access token module 140 is configured to access the recovery access token 18 based on the application group token 10 if the application group exists at the time of requesting the recovery access token 18. In such embodiments, the recovery access token module 140 is configured to receive the application group token 10 from the user initiating recovery and access the recovery access token 18 from the source cluster 102 based on the application group token 18.

In some embodiments, a cluster admin initiates a request for the recovery access token 18 e.g, if the application group does not exist at the time of requesting the recovery access token 18. In such instances, the recovery access token module 140 is configured to access the recovery access token 18 based on a source cluster token 24 for a cluster on which the application group was registered at the time of backup. Further, in such embodiments, the recovery access token module 140 is configured to receive the source cluster token 24 from the cluster admin initiating recovery and access the recovery access token 18 from the source cluster 102 based on the source cluster token 24.

In some embodiments, the cloud admin initiates the recovery request and the recovery access token module 140 is configured to access the recovery access token 18 without the application group token 10 or the source cluster token 24.

Non-limiting examples of information present in the recovery access token 18 include recovery point ID and one or more of organization ID, account ID, cloud ID, region ID, cluster ID of the destination cluster, expiration information, and the like. In some embodiments, the recovery access token 18 comprises information corresponding to the determined recovery point and one or more of a cluster ID of the destination cluster, a cloud ID, or a region ID.

The information present in the recovery access token 18 may be further determined by the user initiating the recovery process. For example, a cluster admin may only be able to generate a recovery access token with a restricted scope where the destination cloud, region, and cluster are all specified. The cloud admin may be able to generate relaxed scope tokens to allow for other workflows, as described in detail later.

The secure recovery system 110 further includes a recovery controller 150 as shown in FIG. 2. The recovery controller 150 is configured to access the recovery access token 18 and generate a recovery token 22 corresponding to the determined recovery point based on the recovery access token 18.

The recovery controller 150 is configured to generate the recovery token 22 based on the information available in the recovery access token 18. In some embodiments, only cloud ID is specified in the recovery access token 18, and the recovery controller 150 is configured to generate a recovery token 22 that is valid on all clusters across all regions within that cloud, thereby allowing for a more relaxed scope. In some embodiments, a region ID is specified along with a cloud ID in the recovery access token 18, and the recovery controller 150 is configured to generate a recovery token 22 that is valid for all clusters in that region within that cloud.

In some embodiments, the recovery controller 150 is configured to generate the recovery token 22 based on the cloud ID and the region ID if the cluster ID field is empty in the recovery access token 18, and the recovery module 150 is configured to initiate the recovery of the application group 102A in any cluster corresponding to the cloud ID and the region ID.1

In some embodiments, a cluster ID, along with region ID and cloud ID is specified in the recovery access token 18, and the recovery controller 150 is configured to generate a recovery token 22 that is valid for a specific destination cluster in that region within that cloud. In such embodiments, the recovery controller 150 is further configured to verify the recovery access token 18 by matching a cluster ID in the recovery access token 18 with a destination cluster token 20 before generating the recovery token 22. The destination cluster token 20 may be stored in the destination cluster 108, as shown in FIG. 2. The recovery controller 150 may be configured to access the destination cluster token 20 from the destination cluster 108 when a recovery process for the application group 102A is initiated.

Referring again to FIG. 2, the recovery module 160 is configured to initiate a recovery of the application group 102A from the backup server 106 in a destination cluster 108 based on the recovery token 22. The destination cluster 106 may be located in the same cluster and same namespace as the source cluster 102, in a different cluster and same namespace as the source cluster 102, or in a different cluster and a different namespace as the source cluster 102.

Figure 4:
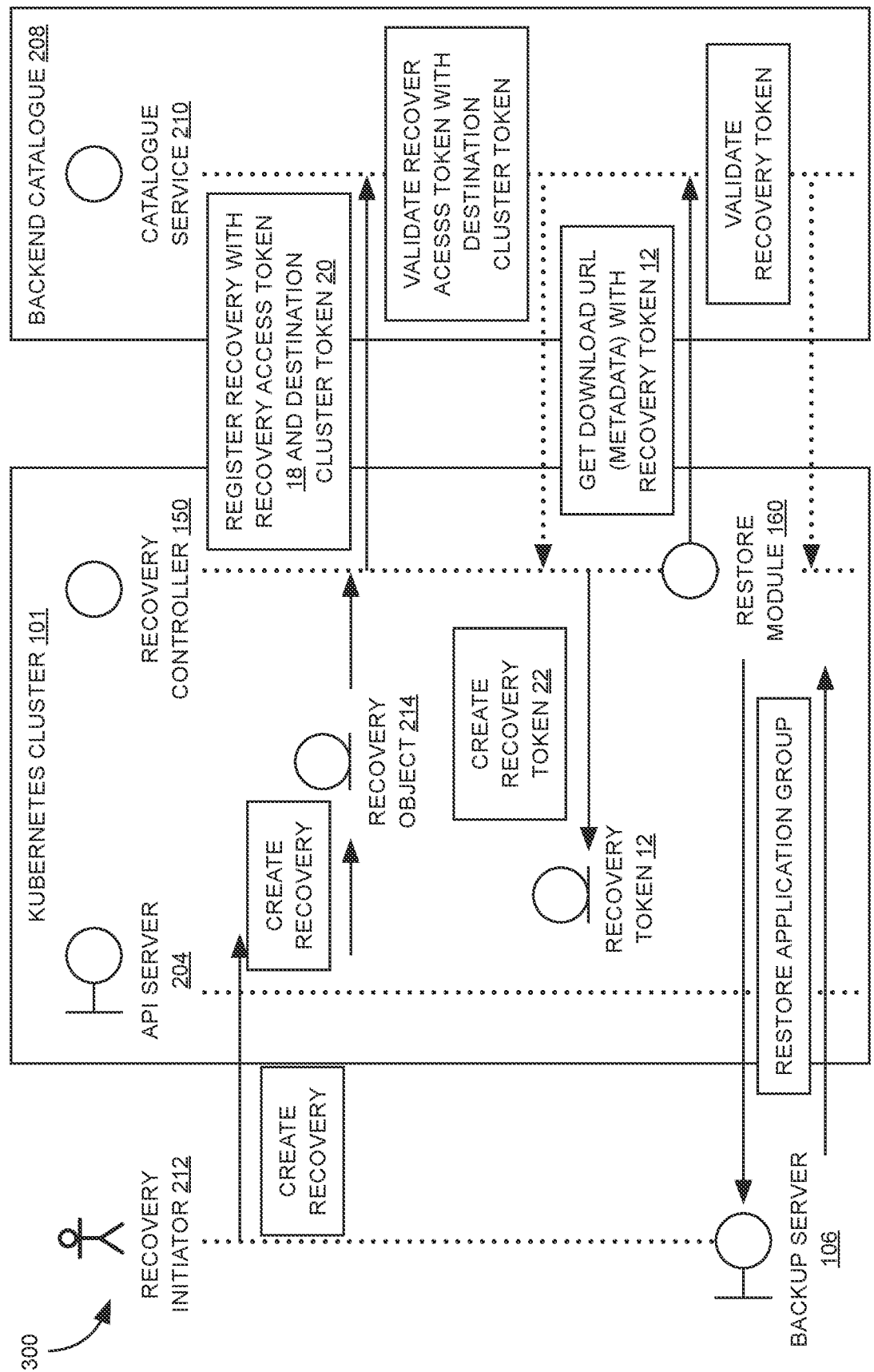
FIG. 4 illustrates an example recovery workflow, according to some aspects of the present description.

FIG. 4 illustrates an example recovery workflow 300 according to embodiments of the present description. As shown in FIG. 4, a recovery initiator 212 (e.g., an application group user/admin) initiates a create recovery request with the API server 204 in the Kubernetes cluster 101. Correspondingly, a recovery object 214 is created in the Kubernetes cluster 101. Upon the creation of the recovery object 214, the recovery controller 150 accesses the recovery access token 18 and a destination cluster token 20, and registers the recovery at the backend catalogue 208. The catalogue service 210 at the backend catalogue 208 validates the recovery access token 18 with the destination cluster token 20 and creates a recovery token 22 in exchange, as shown in FIG. 4. The recovery module 160 requests a download URL from the catalogue serve 210 at the backend catalogue using the recovery token 22, and downloads the backup data from the backup server 106 using the download URL.

Figure 5:
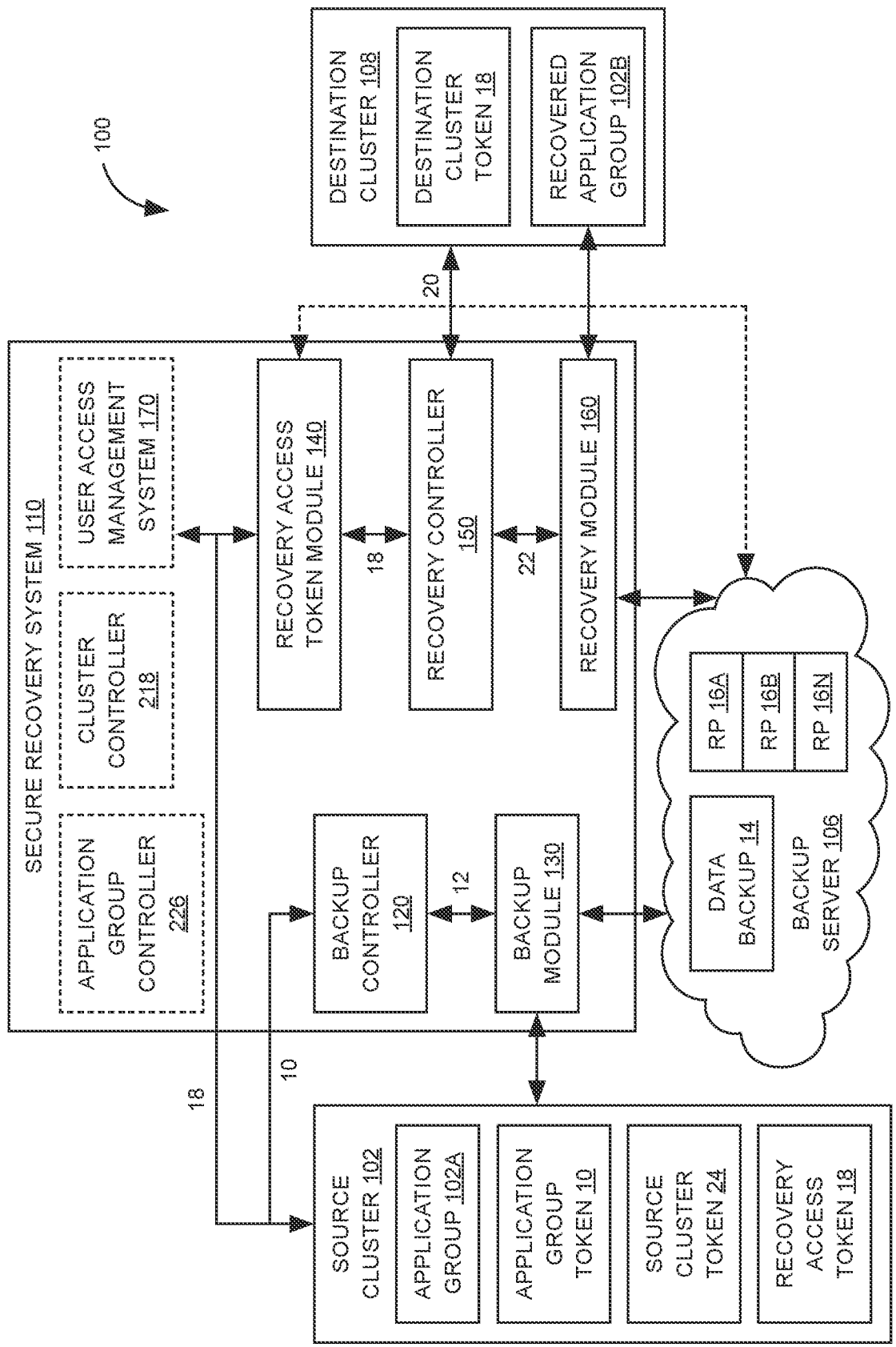
FIG. 5 illustrates an example backup/recovery system environment for secure recovery of an application group in a container deployment environment, according to some aspects of the present description.

In some embodiments, as shown in FIG. 5, the secure recovery system 110 further includes a cluster controller 218 and an application group controller 226. The cluster controller 218 is configured to register a cluster based on a registration token and generate a corresponding cluster token. The application group controller 226 is configured to register an application group in a cluster based on the cluster token and generate an application group token.

Figure 6:
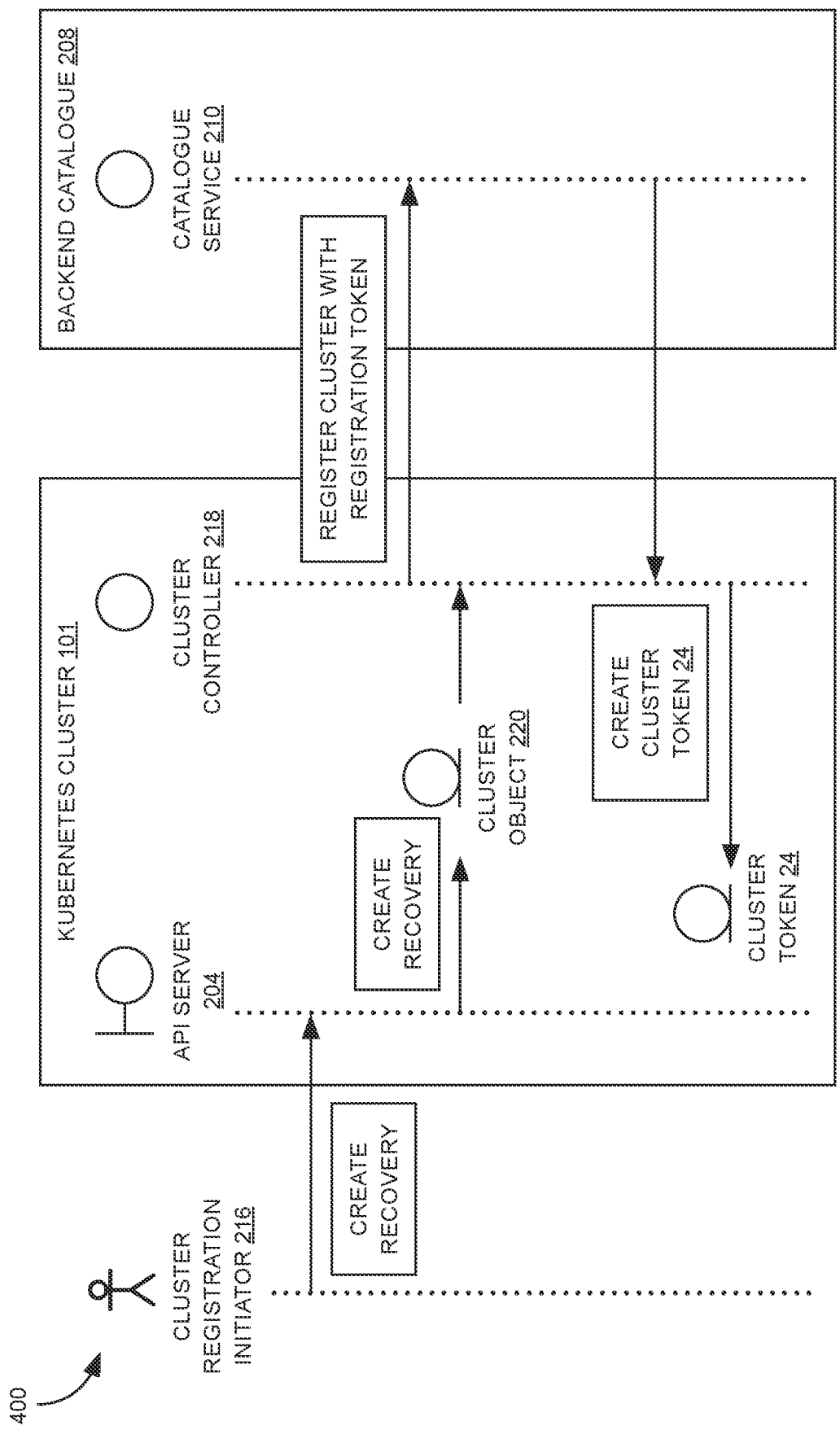
FIG. 6 illustrates an example cluster registration workflow, according to some aspects of the present description.

FIG. 6 illustrates an example cluster registration workflow 400 according to embodiments of the present description. As shown in FIG. 6, a cluster registration initiator 216 (e.g., a cluster admin) initiates a create cluster request with the API server 204 in the Kubernetes cluster 101. Correspondingly, a cluster object 220 is created in the Kubernetes cluster 101. Upon the creation of the cluster object 220, the cluster controller 218 accesses the registration token and registers the cluster at the backend catalogue 208. The catalogue service 210 at the backend catalogue 208 validates the registration token and creates a cluster token 24 in exchange, as shown in FIG. 6.

Figure 7:
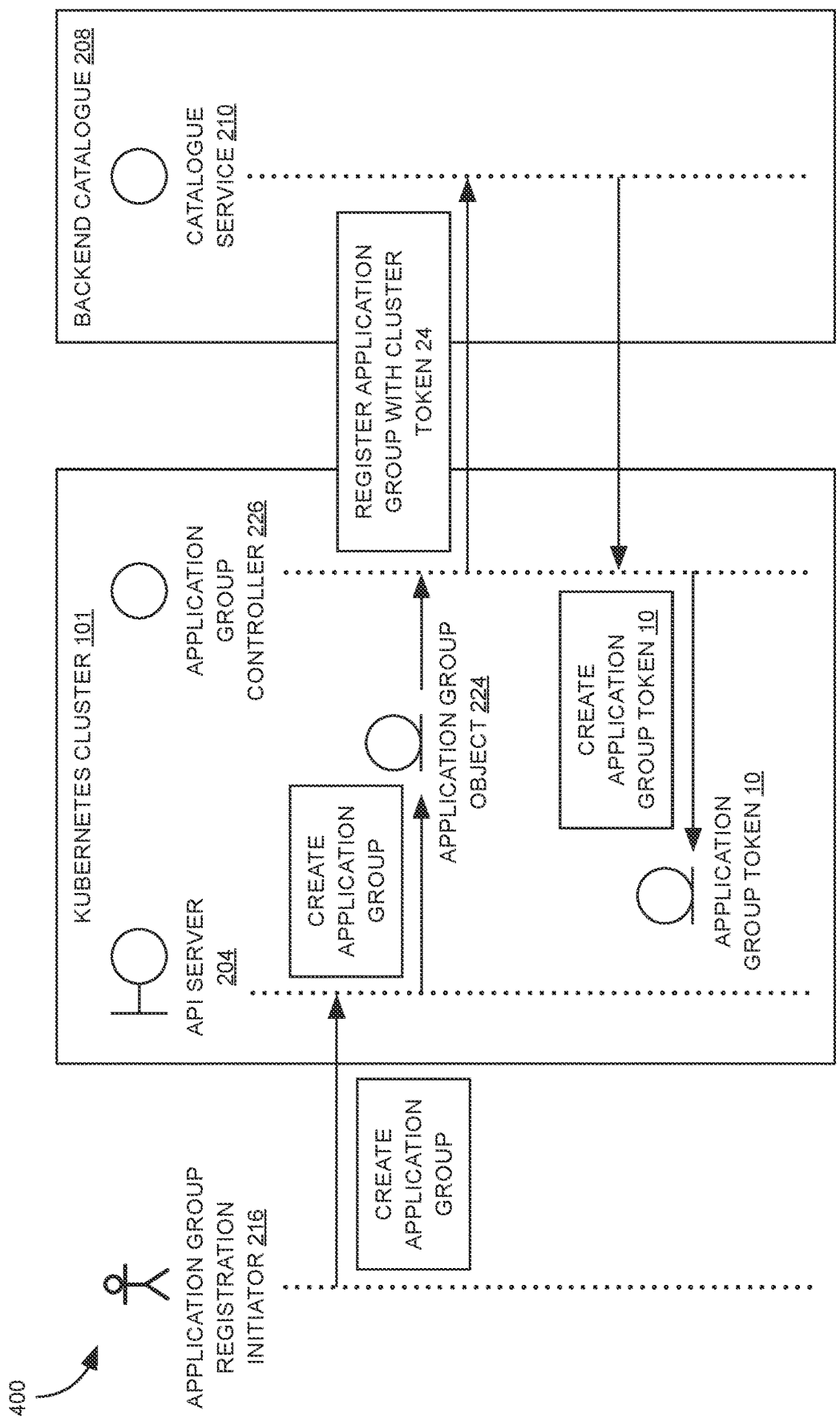
FIG. 7 illustrates an example application group registration workflow, according to some aspects of the present description.

FIG. 7 illustrates an example application group registration workflow 500 according to embodiments of the present description. As shown in FIG. 7, an application group initiator 222 (e.g., an application group user/admin) initiates a create application group request with the API server 204 in the Kubernetes cluster 101. Correspondingly, an application group object 224 is created in the Kubernetes cluster 101. Upon the creation of the application group object 224, the application group controller 226 accesses the cluster token 24 and registers the application group at the backend catalogue 208. The catalogue service 210 at the backend catalogue 208 validates the cluster token 24 and creates an application group token 10 in exchange, as shown in FIG. 7.

The cluster controller 218 may be configured to register the source cluster 102 and the destination cluster 108, and generate the source cluster token 24 and the destination cluster token 18, in accordance with the embodiments of the present description. The application group controller 226 may be configured to register the application group 102A in the source cluster 102 based on the source cluster token 24 and generate the application group token 10.

Figure 8:
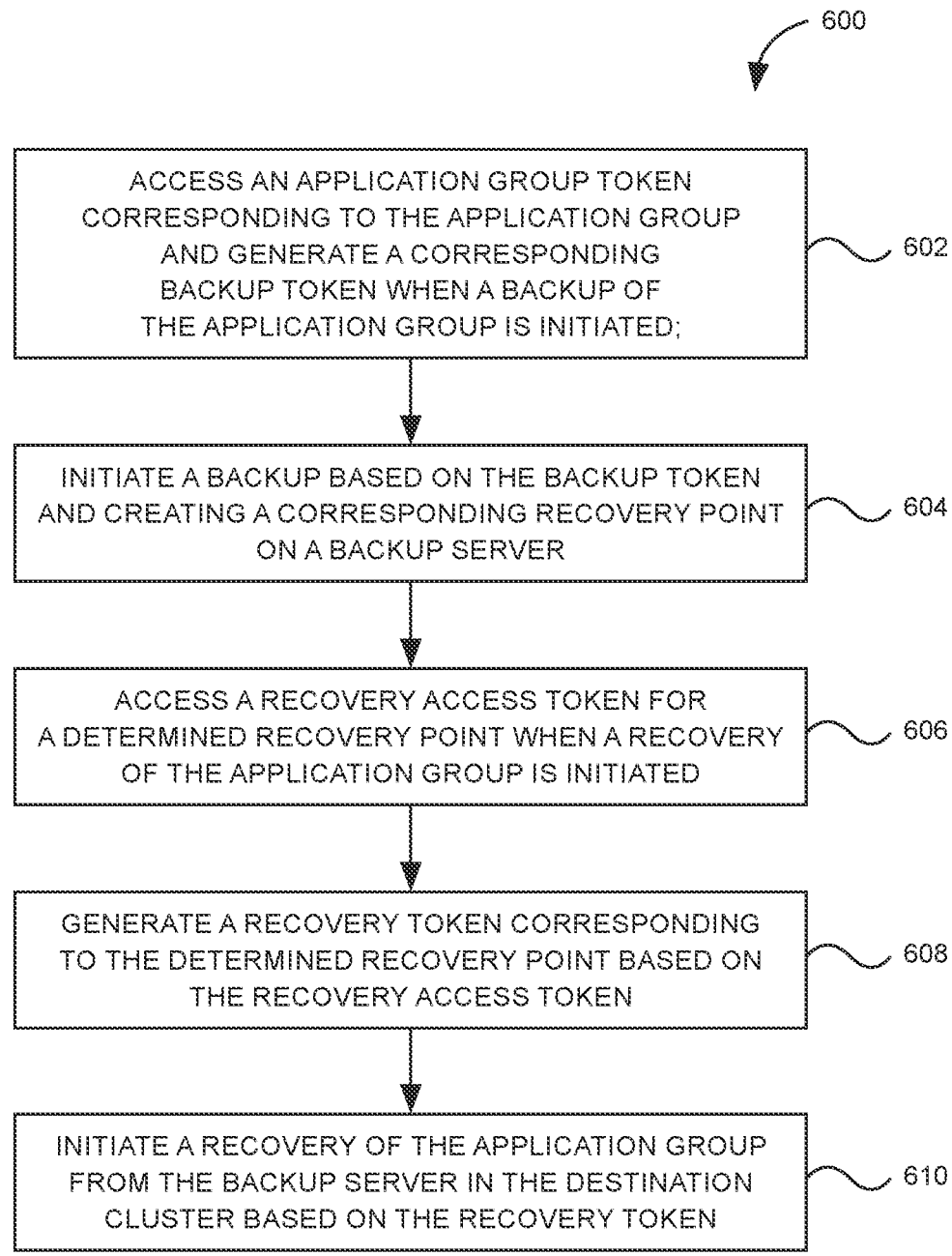
FIG. 8 is a flow chart illustrating a method for secure recovery of an application group in a container deployment environment, according to some aspects of the present description.

FIG. 8 is a flowchart illustrating a method 600 for secure recovery of an application group in a container deployment environment, for example, a Kubernetes environment. The method 600 may be implemented using the secure recovery system 110 of FIGS. 2 and 5 according to some aspects of the present description. Each step of the method 600 is described in detail below.

The method 600 includes, at block 602, accessing an application group token corresponding to the application group and generating a corresponding backup token when a backup of the application group is initiated. In some embodiments, the method 600 further includes registering a cluster based on a registration token and generating a corresponding cluster token; and registering an application group in the cluster based on the cluster token and generating the application group token.

Non-limiting examples of information present in the application group token include organization ID, account ID, cloud ID, region ID, application group instance ID, expiration information, and the like. Non-limiting examples of information present in the backup token include application instance ID, backup ID, and the like.

The method further includes, at block 604, initiating a backup based on the backup token and creating a corresponding recovery point on a backup server. FIG. 3 illustrates an example backup workflow 200 according to embodiments of the present description.

At block 606, the method 600 includes accessing a recovery access token for a determined recovery point when a recovery of the application group is initiated. As noted earlier, the recovery of the application group may be initiated by an application group user, a cluster administrator, or a cloud administrator. Embodiments of the present description provide workflows for all of these instances.

For example, in some embodiments, the recovery of the application group may be initiated by an application group user. In some embodiments, the method 600 further includes, at block 606, matching a userinfo of a user requesting the recovery access token with a userinfo corresponding to the application group before the recovery access token is generated. This may be particularly applicable in instances where the application group may not exist at the time of requesting the recovery access token. In some embodiments, the method 600 includes, at block 606, accessing the recovery access token based on the application group token if the application group exists at the time of requesting the recovery access token.

In some embodiments, the method 600 includes, at block 606, accessing the recovery access token based on a source cluster token for a cluster on which the application group was registered at the time of backup if the application group does not exist at the time of requesting the recovery access token. In such instances, a cluster admin initiates a request for the recovery access token. In some embodiments, the cloud admin initiates the recovery request and the method 600 includes, at block 606, accessing the recovery access token without the application group token or the source cluster token.

The method 600 further includes, at block 606, accessing one or more recovery points from the backup server corresponding to the application group, and allowing a user to select a recovery point from the one or more recovery points as the determined recovery point.

Non-limiting examples of information present in the recovery access token include recovery point ID and one or more of organization ID, account ID, cloud ID, region ID, cluster ID of the destination cluster, expiration information, and the like. In some embodiments, the recovery access token comprises information corresponding to the determined recovery point and one or more of a cluster ID of the destination cluster, a cloud ID or a region ID.

The information present in the recovery access toke may be further determined by the user initiating the recovery process. For example, a cluster admin may only be able to generate a recovery access token with restricted scope where the destination cloud, region and cluster are all specified. The cloud admin may be able to generate relaxed scope tokens to allow for other workflows, as described in detail later.

The method 600 includes, at block 608, generating a recovery token corresponding to the determined recovery point based on the recovery access token.

The method 600 includes, at block 608, generating the recovery token based on the information available in the recovery access token. In some embodiments, only cloud ID is specified in the recovery access token, and the method includes generating a recovery token that is valid on all clusters across all regions within that cloud, thereby allowing for a more relaxed scope. In some embodiments, a region ID is specified along with a cloud ID in the recovery access token, and the method includes generating a recovery token that is valid for all clusters in that region within that cloud.

In some embodiments, a cluster ID, along with region ID and cloud ID is specified in the recovery access token, and the method includes generating a recovery token that is valid for a specific destination cluster in that region within that cloud. In such embodiments, the method 600 further includes, at block 608, verifying the recovery access token by matching a cluster ID in the recovery access token with a destination cluster token before generating the recovery token.

At block 610, the method 600 includes initiating a recovery of the application group from the backup server in the destination cluster based on the recovery token. The destination cluster 106 may be located in the same cluster and the same namespace as the source cluster, in a different cluster and same namespace as the source cluster, or in a different cluster and a different namespace as the source cluster. FIG. 4 illustrates an example recovery workflow 300 according to embodiments of the present description.

Thus, the systems and methods of the present description of the present description allow for secure recovery of application backups by permitting the backup to be restored only in the approved scope (e.g., account, region, org, cloud, etc.) such that no user out of the defined scope can retrieve the application. Further, the systems and methods of the present description provide for identification and preservation of ownership of application admins corresponding to the application backups and retrievals. Furthermore, the systems and methods of the present description facilitate the transfer of ownership and sharing ownership of applications when personas/users change The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 9:
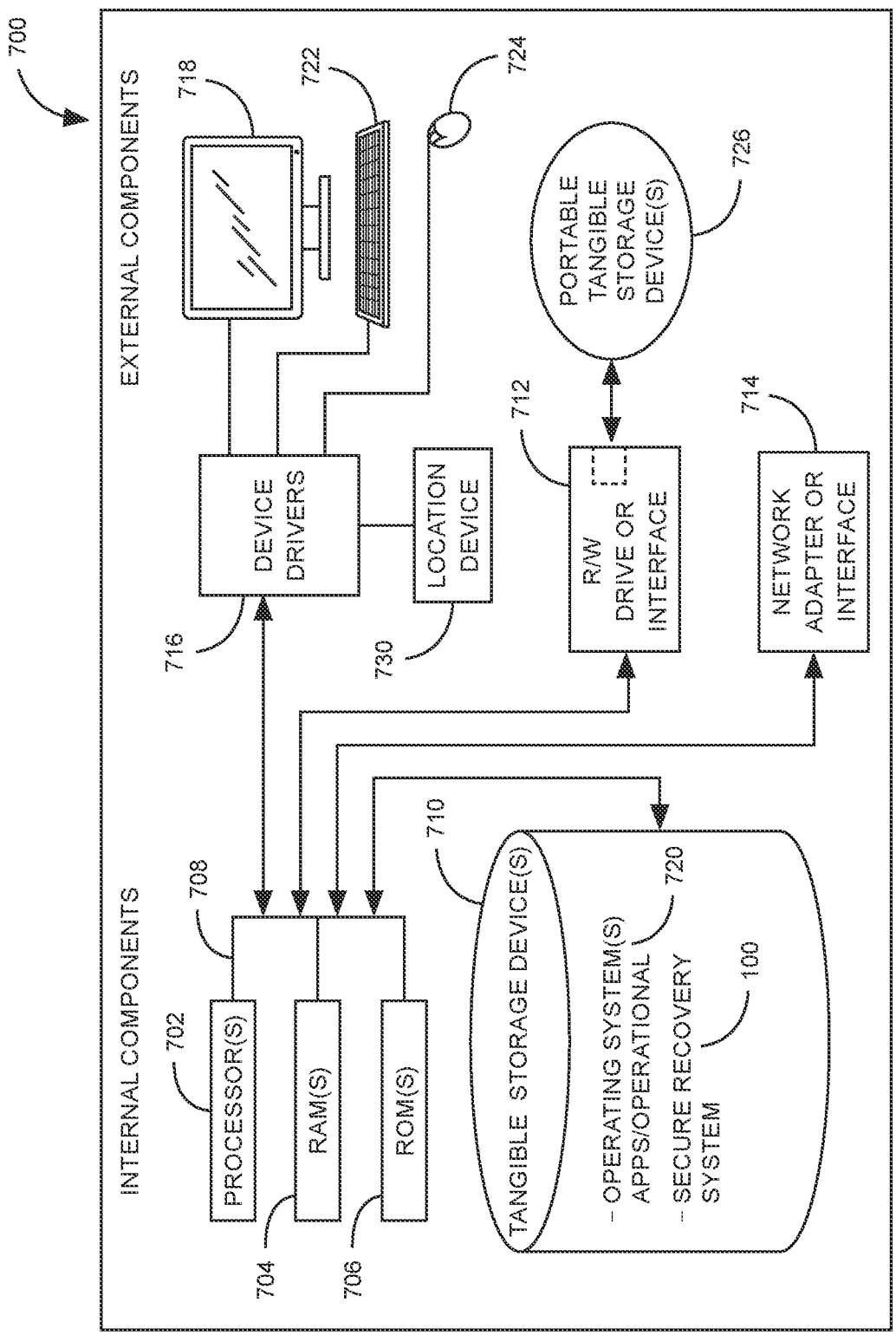
FIG. 9 is a block diagram illustrating an example computer system, according to some aspects of the present description.

One example of a computing system 700 is described below in FIG. 9. The computing system 700 includes one or more processor 702, one or more computer-readable RAMs 704 and one or more computer-readable ROMs 706 on one or more buses 708. Further, the computer system 708 includes a tangible storage device 710 that may be used to execute operating systems 720 and the secure recovery system 110. Both, the operating system 720 and application identification system 100 are executed by processor 702 via one or more respective RAMs 704 (which typically includes cache memory). The execution of the operating system 720 and/or the secure recovery system 110 by the processor 702, configures the processor 702 as a special-purpose processor configured to carry out the functionalities of the operating system 720 and/or the secure recovery system 110, as described above.

Examples of storage devices 710 include semiconductor storage devices such as ROM 506, EPROM, flash memory or any other computer-readable tangible storage device that may store a computer program and digital information.

Computer system 700 also includes a R/W drive or interface 712 to read from and write to one or more portable computer-readable tangible storage devices 726 such as a CD-ROM, DVD, memory stick or semiconductor storage device. Further, network adapters or interfaces 714 such as a TCP/IP adapter cards, wireless Wi-Fi interface cards, or 7G or 4G wireless interface cards or other wired or wireless communication links are also included in the computer system 700.

In one example embodiment, the secure recovery system 110 may be stored in tangible storage device 710 and may be downloaded from an external computer via a network (for example, the Internet, a local area network or another wide area network) and network adapter or interface 714.

Computer system 700 further includes device drivers 716 to interface with input and output devices. The input and output devices may include a computer display monitor 718, a keyboard 722, a keypad, a touch screen, a computer mouse 724, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A system for secure recovery of an application group in a container deployment environment, the system comprising:
   a backup controller configured to access an application group token corresponding to the application group and generate a corresponding backup token when a backup of the application group is initiated;
   a backup module configured to initiate a backup based on the backup token and create a corresponding recovery point on a backup server;
   a recovery access token module configured to access a recovery access token for a determined recovery point when a recovery of the application group is initiated;
   a recovery controller configured to generate a recovery token corresponding to the determined recovery point based on the recovery access token;
   a recovery module configured to initiate a recovery of the application group from the backup server in a destination cluster based on the recovery token;
   wherein the recovery access token comprises information corresponding to the determined recovery point and one or more of a destination cluster ID, a cloud ID, or a region ID; and
   wherein the recovery controller is further configured to verify the recovery access token by matching a cluster ID in the recovery access token with a destination cluster token before generating the recovery token.

2. The system of claim 1, wherein the recovery access token module is configured to access the recovery access token based on:
   the application group token if the application group exists at the time of requesting the recovery access token, or
   a source cluster token for a cluster on which the application group was registered at the time of backup if the application group does not exist at the time of requesting the recovery access token.

3. The system of claim 2, further comprising a user access management module configured to match a userinfo of a user requesting the recovery access token with a userinfo corresponding to the application group before the recovery access token is generated, if the application group does not exist at the time of requesting the recovery access token.

4. The system of claim 1, wherein the recovery access token module is further configured to access one or more recovery points from the backup server corresponding to the application group, and allow a user to select a recovery point from the one or more recovery points as the determined recovery point.

5. The system of claim 1, wherein the recovery controller is configured to generate the recovery token based on the cloud ID and the region ID if the cluster ID field is empty in the recovery access token, and the recovery module is configured to initiate the recovery of the application group in any cluster corresponding to the cloud ID and the region ID.

6. The system of claim 1, further comprising:
   a cluster controller configured to register a cluster based on a registration token and generate a corresponding cluster token; and
   an application group controller configured to register the application group in the cluster based on the cluster token and generate the application group token.

7. The system of claim 1, wherein the system is configured to allow an application group user, a cluster admin, or a backup server admin to initiate the secure recovery of the application group in the container deployment environment.

8. The system of claim 1, wherein the container deployment environment is a Kubernetes environment.

9. A method for secure recovery of an application group in a container deployment environment, the method comprising:
   accessing an application group token corresponding to the application group and generating a corresponding backup token when a backup of the application group is initiated;
   initiating a backup based on the backup token and creating a corresponding recovery point on a backup server;
   accessing a recovery access token for a determined recovery point when a recovery of the application group is initiated;

generating a recovery token corresponding to the determined recovery point based on the recovery access token;

initiating a recovery of the application group from the backup server in the destination cluster based on the recovery token;

wherein the recovery access token comprises information corresponding to the determined recovery point and one or more of a destination cluster ID, a cloud ID, or a region ID; and further comprising verifying the recovery access token by matching a cluster ID in the recovery access token with a destination cluster token before generating the recovery token.

10. The method of claim 9, wherein accessing the recovery access token is based on:

the application group token if the application group exists at the time of requesting the recovery access token, or a source cluster token for a cluster on which the application group was registered at the time of backup if the application group does not exist at the time of requesting the recovery access token.

11. The method of claim 10, further comprising matching a userinfo of a user requesting the recovery access token with a userinfo corresponding to the application group before the recovery access token is generated, if the application group does not exist at the time of requesting the recovery access token.

12. The method of claim 9, further comprising accessing one or more recovery points from the backup server corresponding to the application group, and allowing a user to a select a recovery point from the one or more recovery points as the determined recovery point.

13. The method of claim 9, wherein the method comprises generating the recovery token based on the cloud ID and the region ID if the cluster ID field is empty in the recovery access token, and initiating the recovery of the application group in any cluster corresponding to the cloud ID and the region ID.

14. The method of claim 9, further comprising:

registering a cluster based on a registration token and generating a corresponding cluster token; and registering the application group in the cluster based on the cluster token and generating the application group token.

15. The method of claim 9, wherein the method allows an application group user, a cluster admin, or a backup server admin to initiate the secure recovery of the application group in the container deployment environment.

16. The method of claim 9, wherein the container deployment environment is a Kubernetes environment.

17. A system for secure recovery of an application group in a container deployment environment, the system comprising:

a backup controller configured to access an application group token corresponding to the application group and generate a corresponding backup token when a backup of the application group is initiated;

a backup module configured to initiate a backup based on the backup token and create a corresponding recovery point on a backup server;

a recovery access token module configured to access a recovery access token for a determined recovery point when a recovery of the application group is initiated;

a recovery controller configured to generate a recovery token corresponding to the determined recovery point based on the recovery access token;

a recovery module configured to initiate a recovery of the application group from the backup server in a destination cluster based on the recovery token;

wherein the recovery access token comprises information corresponding to the determined recovery point and one or more of a destination cluster ID, a cloud ID, or a region ID; and wherein the recovery controller is configured to generate the recovery token based on the cloud ID and the region ID if the cluster ID field is empty in the recovery access token, and the recovery module is configured to initiate the recovery of the application group in any cluster corresponding to the cloud ID and the region ID.

18. The system of claim 17, wherein the recovery access token module is configured to access the recovery access token based on:

the application group token if the application group exists at the time of requesting the recovery access token, or a source cluster token for a cluster on which the application group was registered at the time of backup if the application group does not exist at the time of requesting the recovery access token.

19. The system of claim 18, further comprising a user access management module configured to match a userinfo of a user requesting the recovery access token with a userinfo corresponding to the application group before the recovery access token is generated, if the application group does not exist at the time of requesting the recovery access token.

20. The system of claim 17, wherein the recovery access token module is further configured to access one or more recovery points from the backup server corresponding to the application group, and allow a user to select a recovery point from the one or more recovery points as the determined recovery point.

* * * * *